United States Patent
Godfrey et al.

(12)

(10) Patent No.: US 6,575,204 B1
(45) Date of Patent: Jun. 10, 2003

(54) BASTING DEVICE

(75) Inventors: Cyan Godfrey, Singapore (SG); Adam Sanchez, Nutley, NJ (US)

(73) Assignee: WKI Holding Company, Inc., Reston, VA (US)

( * ) Notice: Subject to any disclaimer, the term of this patent is extended or adjusted under 35 U.S.C. 154(b) by 0 days.

(21) Appl. No.: 10/043,920

(22) Filed: Jan. 11, 2002

(51) Int. Cl.⁷ .................................................. B67D 5/06
(52) U.S. Cl. ................... 141/26; 141/1; 99/346
(58) Field of Search ................ 141/1, 21–26; 99/345, 346; 222/206, 215, 420

(56) References Cited

U.S. PATENT DOCUMENTS

| | | |
|---|---|---|
| 811,801 A | 2/1906 | Smith |
| 1,732,279 A | 10/1929 | Reimers |
| 1,963,886 A * | 6/1934 | Chilson ........................ 141/24 |
| 2,073,303 A | 3/1937 | Holder |
| 2,115,959 A | 5/1938 | Lewis |
| 2,130,533 A | 9/1938 | Barton |
| 2,234,884 A | 3/1941 | Teel |
| 2,544,316 A | 3/1951 | Higgins |
| 2,652,765 A | 9/1953 | Risco |
| D192,039 S | 1/1962 | Jones et al. |
| D194,419 S | 1/1963 | Whitton et al. |
| 3,082,681 A | 3/1963 | Peterson |
| D197,795 S | 3/1964 | Friedman et al. |
| D200,376 S | 2/1965 | Weichselbaum |
| 3,215,171 A * | 11/1965 | Mitchell ........................ 141/24 |
| D206,039 S | 10/1966 | Cronin |
| 3,295,523 A | 1/1967 | Weichselbaum |
| 3,319,838 A | 5/1967 | Bayles |
| 3,354,883 A | 11/1967 | Southerland |
| 3,410,457 A | 11/1968 | Brown |
| 3,530,785 A | 9/1970 | Peters et al. |
| D234,228 S | 1/1975 | Spiegel |
| 4,023,305 A | 5/1977 | Harschel |
| 4,129,066 A | 12/1978 | Corley |
| 4,299,851 A | 11/1981 | Lowe |
| 4,349,129 A * | 9/1982 | Amneus ........................ 222/41 |
| 5,154,702 A * | 10/1992 | Foyil ........................... 604/212 |
| 5,408,919 A | 4/1995 | Hutzler et al. |
| D390,425 S | 2/1998 | Henry et al. |
| 5,720,330 A | 2/1998 | Schmalz, Jr. |
| 5,787,799 A | 8/1998 | Mohrhauser et al. |
| 5,875,823 A | 3/1999 | Porter |
| 5,934,187 A | 8/1999 | Leon |

\* cited by examiner

*Primary Examiner*—J. Casimer Jacyna
(74) *Attorney, Agent, or Firm*—Seyfarth Shaw

(57) ABSTRACT

A liquid extraction/discharge device includes an elongate, hollow tube having a proximal end and a distal end and defining an internal passage therethrough, a flexible and resilient squeeze bulb defining a chamber therein and engaged with the proximal end of the tube for providing communication between the passage and the chamber, and a relatively rigid base mounted on the tube adjacent to the proximal end for engagement with the squeeze bulb to provide a support against which the squeeze bulb may be compressed.

20 Claims, 4 Drawing Sheets

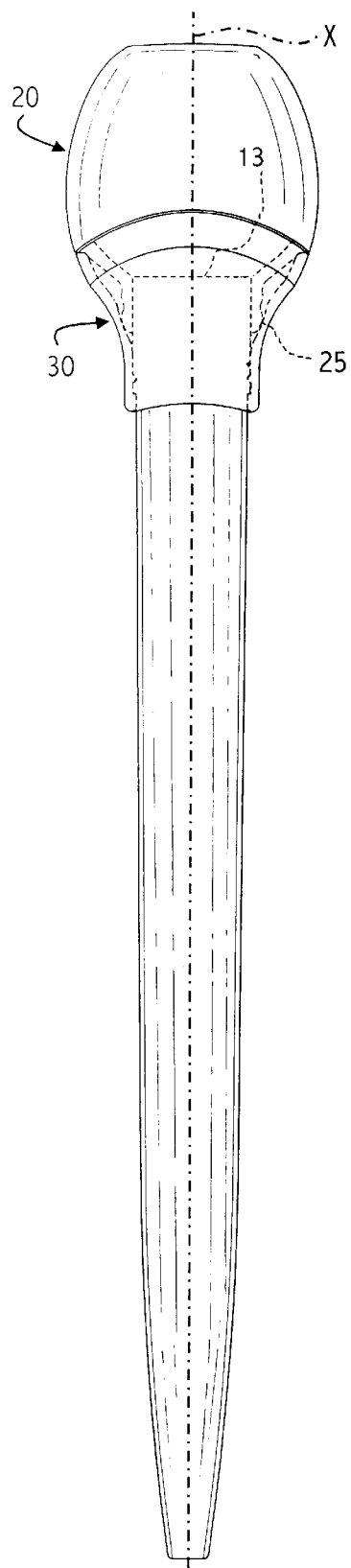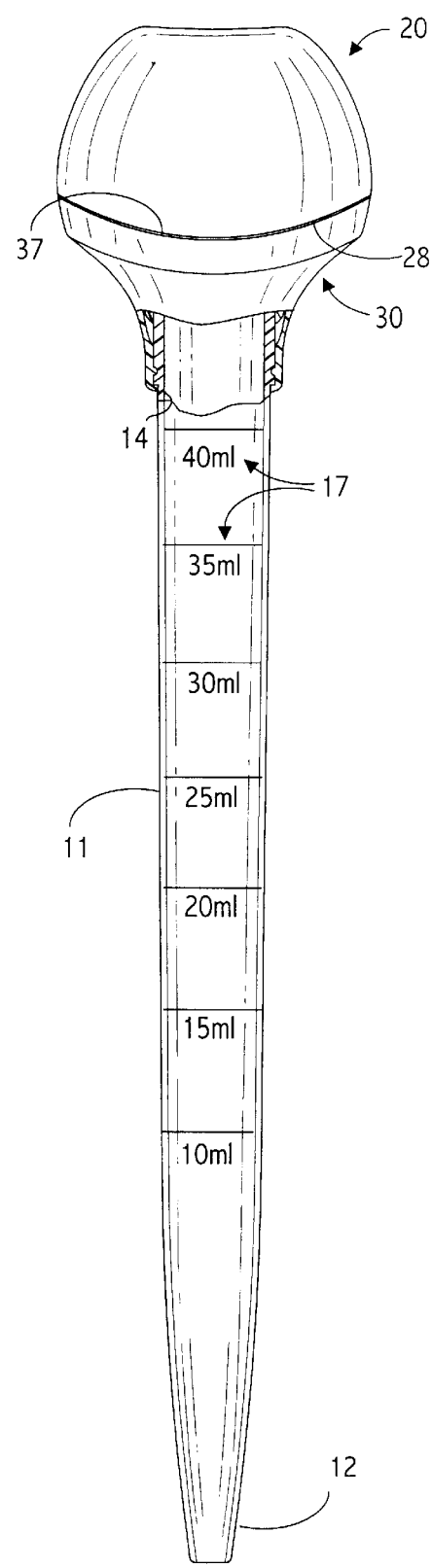

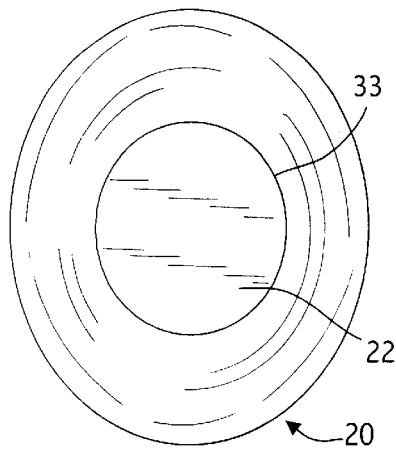
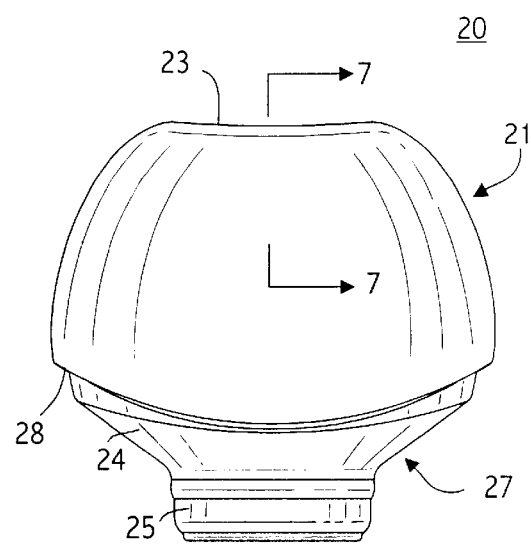
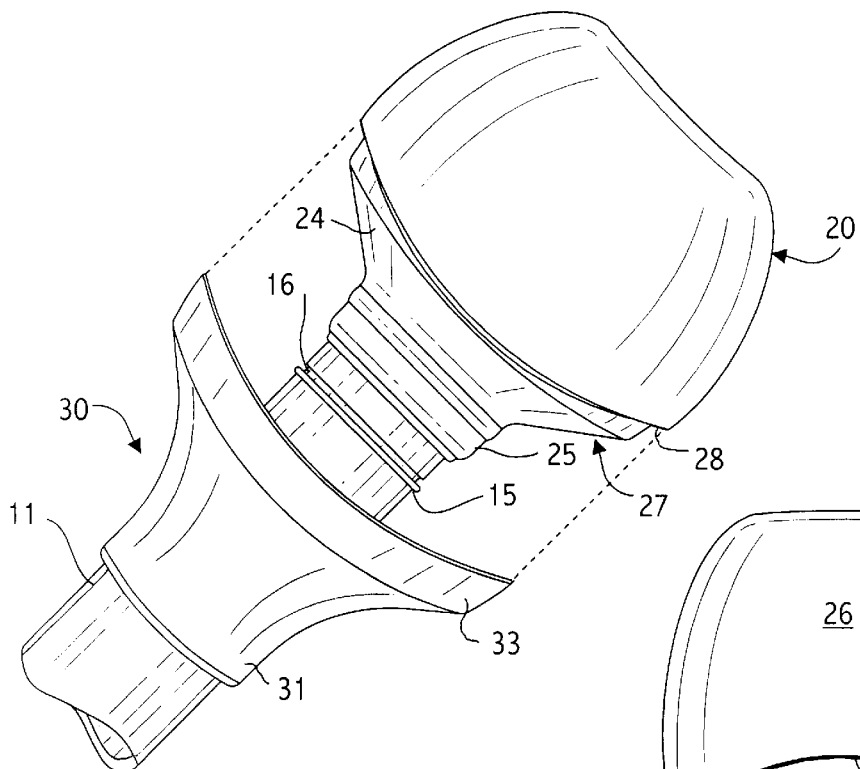
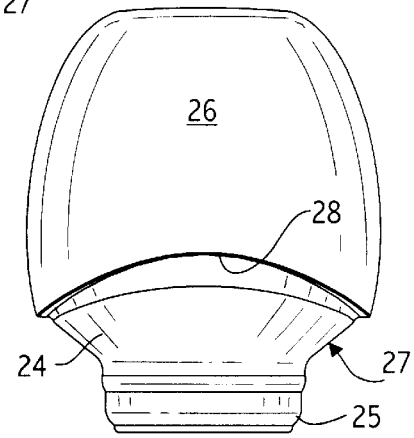
FIG. 3
FIG. 5
FIG. 4
FIG. 6

BASTING DEVICE

BACKGROUND

This application relates broadly to utensils used for extraction and/or discharge of liquids of the type utilizing a tube having a restricted passage opening at one end and a flexible and resilient suction bulb mounted on the other end. The application relates in particular to kitchen utensils of a type commonly known as basters.

A conventional baster commonly uses a rubber squeeze bulb which has an open end that removably attaches to an end of a rigid tube, which extends to an opposite, narrow open distal end. With the bulb squeezed or compressed, to reduce the volume of a hollow interior chamber of the bulb, the distal end of the tube is inserted into a liquid reservoir. Upon releasing the bulb, with the distal end of the tube below the surface, liquid in the reservoir is drawn into and maintained within the tube. To discharge the liquid from the distal end of the tube, the bulb is again squeezed to force air in the hollow interior chamber through the tube, causing the liquid to be expelled from the open distal end.

Typically, in squeezing the bulb it is grasped in the palm of user's hands and squeezed by compressing the fingers toward the heel of the thumb. This squeezing action may be difficult or uncomfortable for certain people, such as those suffering from arthritis or the like. Also, this squeezing action has a tendency to cause the tube to swing or pivot relative to the bulb, which may interfere with proper extraction or discharge of the liquid during a basting operation.

SUMMARY

There is disclosed in this application a liquid extraction and/or discharge apparatus and method which avoid disadvantages of prior apparatuses and methods while affording additional structural and operating advantages.

An important aspect is the provision of an apparatus of the type set forth which is ergonomically designed for comfort and ease of use.

A further aspect is the provision of an apparatus of the type set forth which facilitates exertion of axial forces on the squeeze bulb to minimize swinging of the tube.

A still further aspect is the provision of a unique basting method.

Certain ones of these and other aspects may be attained by providing: a liquid extraction/discharge device comprising: an elongate hollow tube having a proximal end and a distal end and defining an internal passage therethrough, a flexible and resilient squeeze bulb defining a chamber therein and engaged with the proximal end of the tube for providing communication between the passage and the chamber, and a relatively rigid base mounted on the tube adjacent to the proximal end for engagement with the squeeze bulb to provide a support against which the squeeze bulb may be compressed.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

FIG. 1 is a side elevational view of a baster;

FIG. 2 is a front elevational view in partial section of the baster of FIG. 1;

FIG. 3 is a top plan view of the baster of FIG. 2;

FIG. 4 is a fragmentary perspective view of the baster of FIG. 1 illustrating assembly of the base;

FIG. 5 is an enlarged front elevational view of the squeeze bulb of the baster of FIGS. 1–4;

FIG. 6 is a side elevational view of the squeeze bulb of FIG. 5;

DETAILED DESCRIPTION

Figure 12:
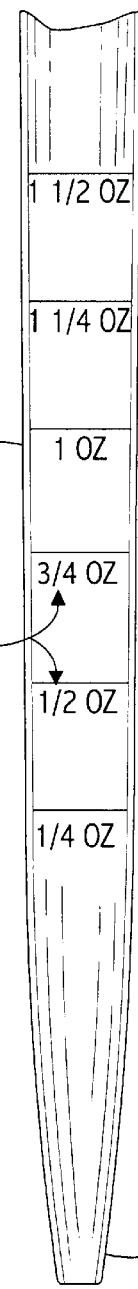
FIG. 12 is a fragmentary rear elevational view of the baster of FIG. 2.

Referring to FIGS. 1–4, there is illustrated a liquid extraction and/or discharge device in the nature of a baster, generally designated by the numeral 10. The baster 10 includes an elongated, hollow, rigid tube 11 which tapers to a reduced-diameter lower or distal end 12 and has a proximal or upper end 13. The tube 11 defines a passage 14 extending longitudinally there-through between the ends thereof. The upper proximal of end 13 has a slightly increased diameter portion defining at its lower end an annular shoulder 15. Formed in the outer surface of the tube 11 a slight distance above the shoulder 15 is a circumferential groove 16. The tube 11 may be formed of a light-transmitting material, such as a suitable transparent plastic and has formed thereon a plurality of longitudinally-spaced volume-indicating indicia, including metric indicia 17 and English indicia 18 (see FIG. 12), respectively disposed on opposite sides of the tube.

Figure 7:
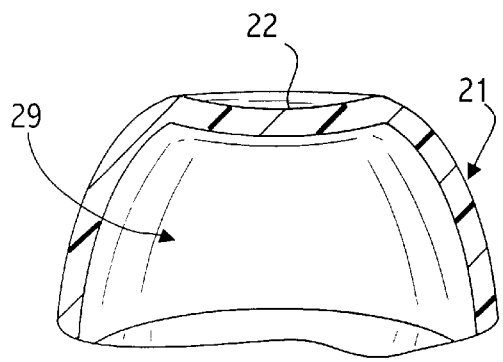
FIG. 7 is a fragmentary sectional view of the squeeze bulb of FIG. 5, taken general along the line 7—7 therein.
Figure 8:
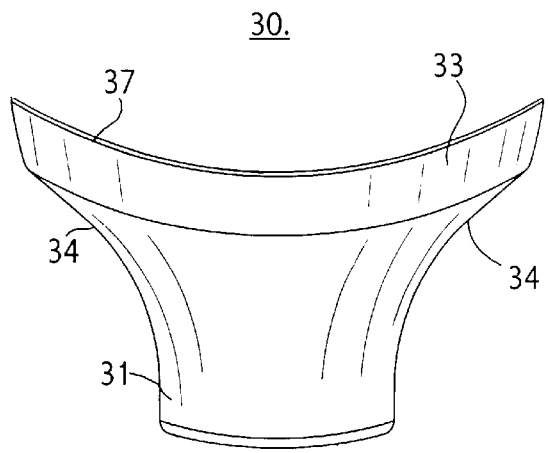
FIG. 8 is an enlarged front elevational view of the base of the baster of FIGS. 1–4.
Figure 9:
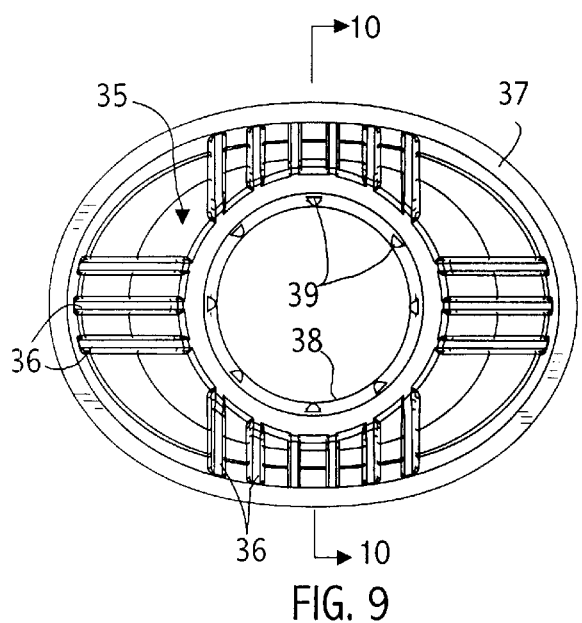
FIG. 9 is a top plan view of the base of FIG. 8.
Figure 10:
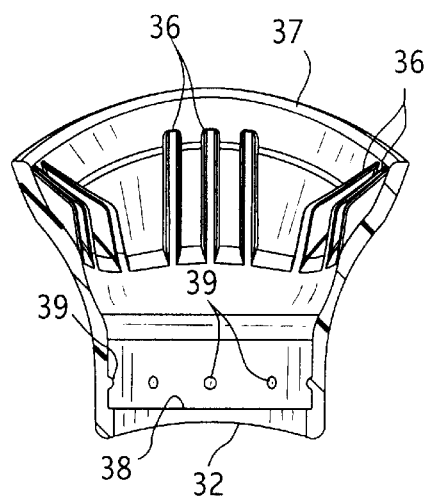
FIG. 10 is a sectional view taken generally along line 10—10 in FIG. 8.

Referring now also to FIGS. 5–7, the baster 10 includes a squeeze bulb 20 formed of a flexible and resilient material, such as a suitable rubber. In particular, the squeeze bulb 20 may be formed of an elastomeric material of a type sold under the trade name SANTOPRENE. The squeeze bulb 20 has a main body 21 which, as viewed from the top (see FIG. 3) is generally oval in shape, having a flattened upper end which defines a slightly concave top depression 22 having an oval rim or perimeter 23 which lies in a plane substantially perpendicular to the longitudinal axis "X" of the tube 11. The squeeze bulb 20 has a tapered lower end 24 which terminates in a cylindrical hollow neck 25. The squeeze bulb 20 has an outer surface 26 which has a recessed or cutaway portion 27 along a lower portion thereof defining a generally saddle-shaped peripheral shoulder 28. The neck 25 defines a circular opening which communicates with a chamber 29 defined within the squeeze bulb 20. The neck 25 is dimensioned to receive therein the upper end 13 of the tube 11 (see FIG. 1) in substantially fluid-tight engagement therewith, the squeeze bulb 20 being easily removable from the tube 11 for purposes of cleaning or the like, all in a known manner.

Referring now also to FIGS. 8–10 and 13, the baster 10 includes a base or yoke 30, which is formed of a suitable, substantially rigid material. In particular, the base 30 is of unitary, one-piece construction and may be molded of a suitable plastic, such as an ABS, although it will be appreciated that other materials could be used. The base 30 has a substantially cylindrical hollow neck 31 having a generally saddle-shaped lower end 32. The base 30 also has a generally saddle-shaped, hollow upper portion 33 which defines wings 34 extending laterally outwardly and upwardly from opposite sides of the neck 31. The upper portion 33 defines a recess 35 which communicates with the neck 31 and has formed on its inner surface four sets of parallel stiffening ribs 36. The upper portion 33 terminates in an upper edge 37. The neck 31 is slightly thickened adjacent to its lower end to define an annular shoulder 38, which projects radially inwardly from the inner surface of the neck, as can best be seen in FIG. 10. Projecting radially inwardly from the neck 31 just above the shoulder 38 is a plurality of circumferentially-spaced beads 39, which may be 8 in number.

Figure 13:
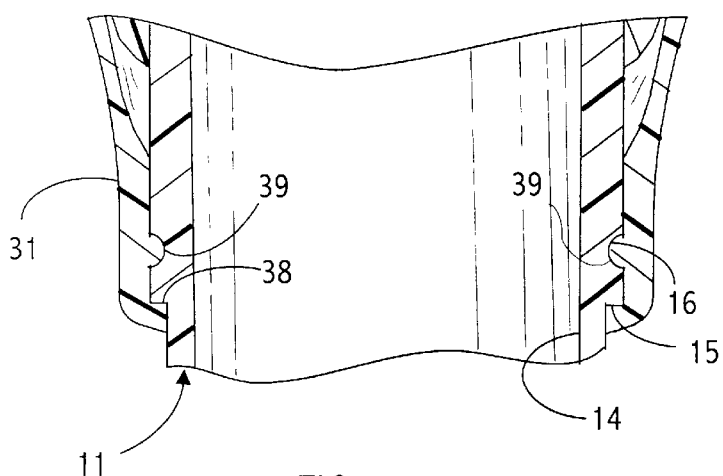
FIG. 13 is an enlarged fragmentary view of the sectioned portion FIG. 2.

Referring to FIGS. 4 and 13, in assembly, after the squeeze bulb 20 has been mounted on the upper end 13 of the tube 11, the base 30 is slid over the distal end 12 of the tube 11, to an installed position illustrated in FIGS. 1–3, wherein the beads 39 are snap-fitted in the circumferential groove 16 of the tube 11, with the shoulder 38 of the base 30 bearing against the shoulder 15 of the tube 11 to serve as a stop. The base 30 is rotationally oriented so that, in this use position, the tapered lower end 24 and neck 25 of the squeeze bulb 20 nest within the base or yoke 30, with the upper edge 37 of the base 30 closely adjacent to the shoulder 28 of the squeeze bulb 20, so that the outer surface 26 of the squeeze bulb 20 is substantially flush with the outer surface of the base 30. Thus, the base 30 gives the appearance of being a continuation or extension of the squeeze bulb 20.

Figure 11:
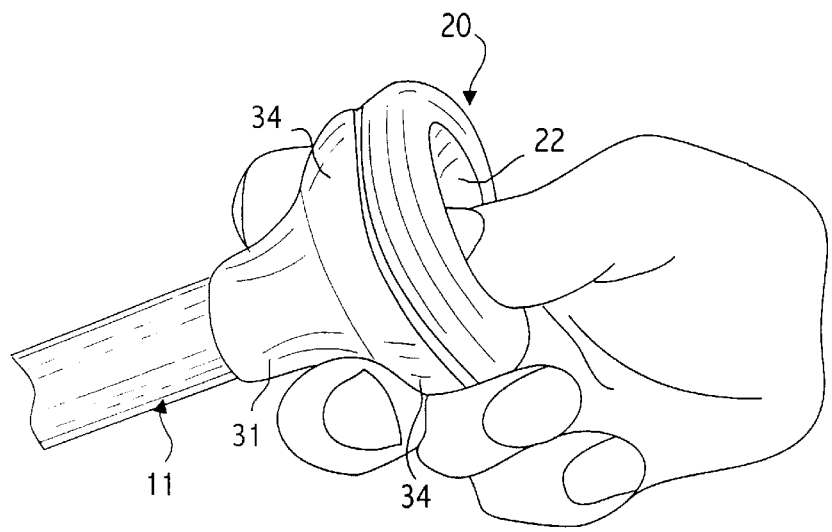
FIG. 11 is a fragmentary perspective view illustrating use of the baster of FIGS. 1–4.

Referring now to FIG. 11, in operation the user grasps the baster 10 by hooking the index and middle fingers of one hand respectively under the wings 34 of the base 30, with the thumb of that hand seated in the top depression 22 of the squeeze bulb 20. The squeeze bulb 20 is then depressed downwardly with the thumb in a direction axially of the tube 11, the tapered lower end 12 of the tube 11 is inserted in the liquid, and the squeeze bulb 20 is released to draw liquid into the tube 11. The squeeze bulb 20 is again depressed to discharge the liquid from the tube 11. It will be appreciated that this arrangement provides for an easy and comfortable gripping of the baster 10.

Furthermore, the rigid connection between the tube 11 and the base 30 prevents any swinging or pivotal movement of the tube 11 relative to the base 30, while the wide seating engagement of the base 30 against the lower portion of the squeeze bulb 20, together with the axial exertion of force in squeezing the bulb 20, inhibits any tilting or swinging movement of the base 30 relative to the squeeze bulb 20 in use. The base 30 provides a firm, rigid seat against which the squeeze bulb is compressed during the squeezing operation. In particular, the upper surfaces of the stiffening ribs 36 cooperate to define a seat for the tapered lower end 24 of the squeeze bulb 20, while the upper edge 37 of the base 30 provides a seat for the shoulder 28 of the squeeze bulb 20. It will be appreciated that, for cleaning purposes, the base 30 can easily be detached from the tube 11.

While specific materials have been disclosed for the various parts of the baster 30, it will be appreciated that other materials could be used. Also, while the baster 20 is specifically intended for basting operations, it would be appreciated that the principles employed are useful in other applications involving extraction and/or discharge of liquids.

The matter set forth in the foregoing description and accompanying drawings is offered by way of illustration only and not as a limitation. While a particular embodiment has been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A liquid extraction/discharge device comprising:
    an elongate hollow tube having a proximal end and a distal end and defining an internal passage therethrough,
    a flexible and resilient squeeze bulb defining a chamber therein and removably engaged with the proximal end of the tube for providing communication between the passage and the chamber, and
    a relatively rigid base removably mounted on the tube adjacent to the proximal end independently of the squeeze bulb for engagement with the squeeze bulb to provide a support against which the squeeze bulb may be compressed.

2. The device of claim 1, wherein the distal end of the tube is tapered to a narrow opening.

3. The device of claim 1, wherein the tube is formed of a light-transmitting material, and further comprising volume indicia spaced longitudinally along the tube.

4. The device of claim 1, wherein the squeeze bulb has a cylindrical neck portion engaged with the proximal end of the tube.

5. The device of claim 4, wherein the proximal end of the tube is received in the neck portion in substantially fluid-tight engagement therewith.

6. The device of claim 4, and further comprising first attachment structure on the neck portion and second attachment structure on the base snap-engageable with the first attachment structure.

7. The device of claim 1, wherein the squeeze bulb is substantially oval in transverse cross-sectional shape.

8. The device of claim 7, wherein the base has a generally saddle-shaped upper end, the squeeze bulb having a lower end shaped and dimensioned to substantially mate with the upper end of the base.

9. The device of claim 8, wherein the squeeze bulb has an outer surface with a recessed lower end dimensioned to fit within the upper end of the base so that outer surfaces of the squeeze bulb and the base are substantially flush with each other.

10. A liquid extraction/discharge device comprising:
    an elongate hollow tube having a proximal end and a distal end and defining an internal passage therethrough,
    a flexible and resilient squeeze bulb defining a chamber therein and engaged with the proximal second end of the tube for providing communication between the passage and the chamber, and
    a relatively rigid base mounted on the tube adjacent to the proximal end for engagement with the squeeze bulb to provide a support against which the squeeze bulb may be compressed,
    the base having a pair of spaced-apart wings extending laterally outwardly from the tube so that the index and middle finger of a user's hand may respectively be hooked beneath the wings when the thumb of the hand engages the top of the squeeze bulb to facilitate one-hand operation, the wings cooperating to define a generally saddle-shaped upper end of the base for receiving the bulb.

11. The device of claim 10, wherein the wings extend in substantially opposite directions.

12. The device of claim 10, wherein the upper end of the base defines a recess for receiving a lower end of the squeeze bulb, the upper end of the base including spaced-apart stiffening ribs cooperating to define a seating surface for the lower end of the squeeze bulb.

13. The device of claim 10, and further comprising an annular groove form in the outer surface of the tube adjacent to the proximal end thereof, and attachment structure on the base snap-engageable in the annular groove.

14. The device of claim 13, wherein the attachment structure includes a plurality of circumferentially spaced beads.

15. The device of claim 13, and further comprising a first annular stop shoulder on the tube and a second annular stop shoulder on the base engageable with the first shoulder to limit axial movement of the base toward the proximal end of the tube.

16. The basting device of claim 10, wherein the tube has a longitudinal axis and the squeeze bulb has a recessed upper end wall with a peripheral edge lying in a plane substantially perpendicular to the axis.

17. A method of using a basting device having an elongate hollow tube and a flexible and resilient squeeze bulb coupled to an end of the tube for communication therewith, the method comprising:

removably mounting on the tube independently of the squeeze bulb a relatively rigid base having a pair of spaced-apart wings extending laterally outwardly from the tube and disposed for engagement with the squeeze bulb, grasping the device by hooking the index finger and middle finger of one hand respectively beneath the wings of the base while the thumb of the one hand engages the top of the squeeze bulb, and then squeezing and releasing the squeeze bulb toward and away from the base with the thumb of the one hand.

18. The method of claim 17, wherein the base is removably mounted on the tube.

19. The method of claim 18, wherein the mounting includes snap-engaging the base with the tube.

20. The method of claim 17, wherein the tube has a longitudinal axis and the squeezing and releasing includes applying and releasing pressure in a direction substantially axially of the tube.

* * * * *